(12) United States Patent
Brenninger

(10) Patent No.: US 8,984,973 B1
(45) Date of Patent: Mar. 24, 2015

(54) MULTIPLE SPEED POWER TAKE OFF

(71) Applicant: AGCO International GmbH, Neuhausen am Rheinfall (CH)

(72) Inventor: Martin Brenninger, Marktoberdorf (DE)

(73) Assignee: AGCO International GmbH, Marktoberdorf (DE)

( * ) Notice: Subject to any disclaimer, the term of this patent is extended or adjusted under 35 U.S.C. 154(b) by 0 days.

(21) Appl. No.: 14/074,114

(22) Filed: Nov. 7, 2013

(51) Int. Cl.
 *B60K 25/06* (2006.01)

(52) U.S. Cl.
 CPC ........................... *B60K 25/06* (2013.01)
 USPC .............................................. 74/15.4

(58) Field of Classification Search
 CPC ........................................ B60K 25/06
 USPC ............................. 74/15.4; 180/53.61
 See application file for complete search history.

(56) References Cited

U.S. PATENT DOCUMENTS

| | | | | | |
|---|---|---|---|---|---|
| 3,916,711 | A | * | 11/1975 | Hoyer | 74/360 |
| 4,579,015 | A | * | 4/1986 | Fukui | 74/329 |
| 4,581,949 | A | * | 4/1986 | Mann et al. | 74/15.4 |
| 4,667,536 | A | * | 5/1987 | Ehrlinger et al. | 74/720 |
| 4,824,128 | A | * | 4/1989 | Takagi et al. | 180/53.1 |
| 5,239,887 | A | * | 8/1993 | Muller et al. | 74/665 GA |
| 5,245,892 | A | * | 9/1993 | Kim et al. | 74/665 GA |
| 5,301,564 | A | * | 4/1994 | Muller et al. | 74/333 |
| 5,937,697 | A | * | 8/1999 | Matsufuji | 74/11 |
| 6,199,653 | B1 | * | 3/2001 | Matsufuji et al. | 180/233 |
| 6,668,964 | B2 | * | 12/2003 | Braud | 180/292 |
| 6,854,541 | B2 | * | 2/2005 | Matufuji et al. | 180/53.1 |
| 7,121,162 | B2 | * | 10/2006 | Hatakeyama et al. | 74/360 |
| 8,393,236 | B1 | * | 3/2013 | Hauser et al. | 74/15.4 |
| 8,667,865 | B2 | * | 3/2014 | Hoyle et al. | 74/665 A |
| 2005/0016304 | A1 | * | 1/2005 | Ishii et al. | 74/15.4 |
| 2014/0076073 | A1 | * | 3/2014 | Kiyokawa et al. | 74/15.2 |

FOREIGN PATENT DOCUMENTS

| | | | | |
|---|---|---|---|---|
| GB | 2129385 A | * | 5/1984 | B60K 17/02 |
| GB | 2179413 A | | 3/1987 | |
| GB | 2363830 A | | 1/2002 | |
| JP | 57090455 A | * | 6/1982 | F16H 37/06 |

OTHER PUBLICATIONS

GB Search Report for GB Application No. 1220040.8.

* cited by examiner

*Primary Examiner* — Nicole Verley

(57) ABSTRACT

A power take off drive train for a utility vehicle, comprising first (31, 59), second (35, 55) and third (23, 68) parallel gear pairs, with an input shaft (8) coupled to a gear (31) of the first gear pair. First (K1) and second (K2) connector means, suitably clutches, each operate to couple a gear (31, 59) of the first gear pair with a respective gear (35, 55) of the second gear pair. A third connector (10, 11) couples a first gear (35) of the second gear pair with a first gear (23) of the third gear pair, and a selector mechanism (12) operates to couple a PTO output shaft (7) with either a second gear (55) of the second gear pair or a second gear (68) of the third gear pair.

8 Claims, 2 Drawing Sheets

| PTO rpm | 540 | 540E | 1000 | 1000E |
|---|---|---|---|---|
| Input rpm | 1934 | 1596 | 1903 | 1571 |
| Pairs used | 3 | 1 | 1 | 1 |
| K1 | | X | | X |
| K2 | X | | X | |
| S1 | | | X | X |
| S2 | X | X | | |

US 8,984,973 B1

MULTIPLE SPEED POWER TAKE OFF

FIELD OF THE INVENTION

This invention relates to a drive train for a power take off shaft, and particularly to a drive train for the power take off shaft of a utility vehicle such as an agricultural tractor.

BACKGROUND TO THE INVENTION

Agricultural tractors are generally provided with at least one power take off shaft in order that implements, such as rotary harrows, fertilizer spreaders, sprayer pumps, balers, etc may be driven.

Implement manufacturers now manufacture tractors and implements to run at one of three standard speeds, namely, 540 rpm, 1000 rpm, and ground speed. The term "ground speed" means that the rate of rotation of the power take off shaft is proportional to the speed at which the tractor travels across the ground.

Since implements are manufactured to these standards, it is necessary for tractors to be provided with power take off shafts which rotate at the required speed. Power take off gear trains have been developed which provide for the selection of different speeds, eg 1000 rpm, 540 rpm, ground speed. Clearly, in the case of a fixed rotation speed, i.e. 1000 rpm, or 540 rpm, this can only be achieved at a certain engine speed. The manufacturer selects this speed, and usually a speed towards the maximum engine speed is selected, thereby permitting engine speed to fall as load on the power take off shaft increases.

Where the load on the power take off shaft is relatively low, the torque back up provided by running the engine at a high speed is not required. It is therefore not efficient to run the engine at high speed, but this is required in order for the power take off shaft to rotate at the required speed. In order to overcome this problem, manufacturers often provide what is known as a 540 rpm economy power take off shaft. Effectively, the gear train is arranged such that the power take off shaft runs at 540 rpm with an engine speed of about two thirds maximum speed, and as such the tractor's fuel economy improves and the engine is quieter. With further gearing, an economy mode at 1000 rpm may also be provided.

Problems can arise, however, with providing an economy mode in that the additional gearing takes up valuable space in the already crowded area of a tractor rear axle, and also it is not generally possible to shift from economy to conventional mode (without stopping the tractor) if there is a sudden torque demand.

SUMMARY OF THE INVENTION

The invention provides a power take off drive train for a utility vehicle, comprising:
first, second and third parallel gear pairs;
an input shaft coupled to a gear of the first gear pair;
first and second connector means, each operable to couple a gear of the first gear pair with a gear of the second gear pair;
third connector means coupling a first gear of the second gear pair with a first gear of the third gear pair;
an output shaft; and
selector means operable to couple the output shaft with either a second gear of the second gear pair or a second gear of the third gear pair.

With the arrangement of three parallel gear pairs and the first and second connectors means, which are suitably clutch mechanisms, four PTO input/output speed combinations may be provided with two pairs from the combination being switchable under load. As will be shown in connection with an exemplary embodiment below, with a suitable choice of gear ratios for each of the three gear pairs, an output arrangement of 540 rpm, 540 rpm economy, 1000 rpm and 1000 rpm economy may be provided, with switching under load being possible between conventional and economy modes at each output speed.

In the power take off drive train of the invention, a first gear of each gear pair suitably shares a common axis of rotation with the input shaft and/or a second gear of each gear pair shares a common axis of rotation with the output shaft.

The selector means may be a sliding sleeve mechanism connected with the output shaft and movable in the axial direction thereof into driving engagement with the second gear of either the second gear pair or third gear pair.

The third connector means may be a common shaft on which the first gears of the second and third gear pairs are mounted or it may be a clutch mechanism or other connection mechanism selectively operable to connect and disconnect the first gears of the second and third gear pairs.

The present invention further provides a utility vehicle having an engine and a power take off drive train as recited above, with the input shaft driven by the engine.

BRIEF DESCRIPTION OF THE DRAWINGS

Embodiments of the present invention will now be described, by way of example only and with reference to the accompanying drawings, in which.

DETAILED DESCRIPTION OF THE DRAWINGS

Figures 1, 3:
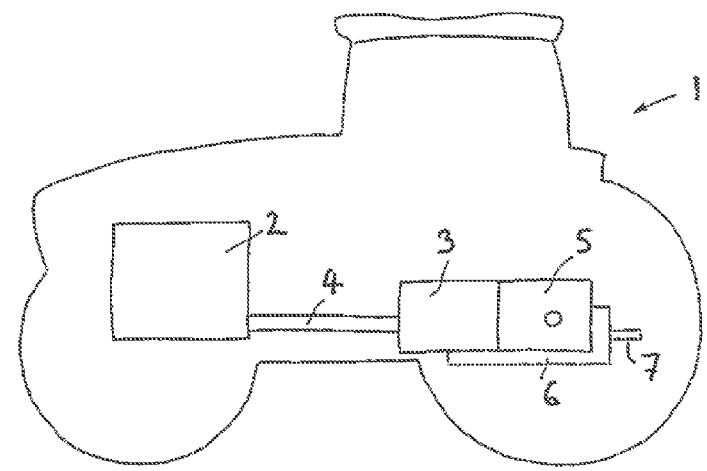
FIG. 1 is a schematic illustration of an agricultural tractor comprising a power take off drive train according to the invention.
FIG. 3 is a table representation of different operational combinations of the arrangement of FIG. 2.

FIG. 1 shows an agricultural utility vehicle in the form of a tractor 1 having a prime mover (combustion engine 2) coupled to transmission/gearbox arrangement 3 via driveshaft 4. The output of the transmission/gearbox arrangement 3 is drivingly coupled to the tractor rear axle assembly 5. Arrangements for driving the front wheels, where provided, are conventional and are omitted from the Figure.

Also coupled with the driveshaft 4, via the gearbox 3, is a power take off (PTO) drive train 6 including a PTO output shaft 7.

Figure 2:
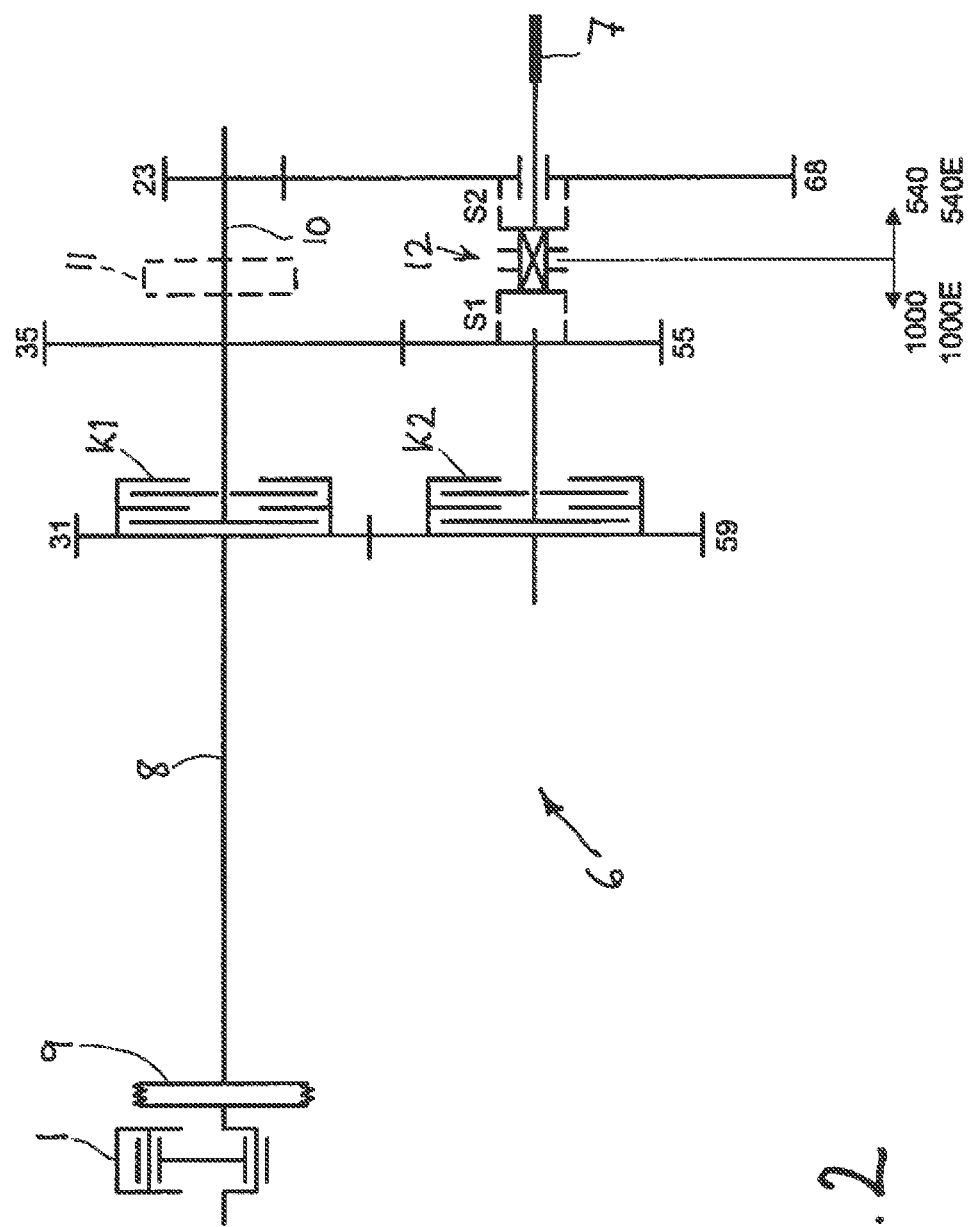
FIG. 2 schematically represents an arrangement of gearing used in the drive train of FIG. 1.

The components of the PTO drivetrain 6 are schematically shown in FIG. 2, with the vehicle engine 2 driving an input shaft 8 via flywheel 9. Three parallel pairs of gears are provided: the numbers appearing above and below each pair in the Figure represent the gear ratio of the pair, and will also be used herein as reference numerals to identify the individual gears. Hence the first gear pair has a ratio of 31:59, the second gear pair has a ratio of 35:55, and the third gear pair has a ratio of 23:68.

The first gears 31, 35, 23 of each pair share a common rotational axis with the input shaft 8. A first clutch mechanism K1 is provided between gears 31 and 35, which clutch mechanism may be operated to connect the gears to rotate together or to separate them. Gears 35 and 23 share a common shaft 10 and rotate together although, as indicated by dashed line 11, a further connector such as a clutch mechanism may be provided to allow selective breaking of the link as will be discussed further below.

The second gears 59, 55, 68 of each pair share a common rotational axis with the output PTO shaft 7. A second clutch mechanism K2 is provided between gears 59 and 55, which clutch mechanism may be operated to connect the gears to rotate together or to separate them.

Between gears 55 and 68 a sliding sleeve coupling mechanism 12 is provided. The sleeve is connected to the output shaft 7 and is slidable to a first position S1 in which the sleeve driveably engages with gear 55, and to a second position S2 in which the sleeve driveably engages with gear 68. In this way, the output shaft 7 may be switched to rotate at the same speed as either of gears 55 and 68.

Referring now additionally to the table of FIG. 3, the different interconnection options provided by selective operation of clutch mechanisms K1 and K2 and sliding sleeve 12 are discussed. Note that an interlock function may be applied to clutch mechanisms K1 and K2 such that only one of them may be engaged at any time.

To produce a PTO shaft rotation speed of 540 rpm in conventional mode (assuming a relatively high input shaft speed of approximately 1900 rpm), clutch mechanism K2 is engaged (and K1 disengaged) and the sliding sleeve is in position S2. In this configuration, torque is transmitted through all three gear pairs, in the order 31, 59, 55, 35, 23, 68.

To produce a PTO shaft rotation speed of 540 rpm in economy mode (assuming a reduced input shaft speed of approximately 1600 rpm), clutch mechanism K1 is engaged (and K2 disengaged) and the sliding sleeve is in position S2. In this configuration, torque is transmitted through just the third gear pair, in the order 23, 68.

To produce a PTO shaft rotation speed of 1000 rpm in conventional mode (assuming a relatively high input shaft speed of approximately 1900 rpm), clutch mechanism K2 is engaged (and K1 disengaged) and the sliding sleeve is in position S1. In this configuration, torque is transmitted through just the first gear pair, in the order 31, 59.

To produce a PTO shaft rotation speed of 1000 rpm in economy mode (assuming a reduced input shaft speed of approximately 1600 rpm), clutch mechanism K1 is engaged (and K2 disengaged) and the sliding sleeve is in position S1. In this configuration, torque is transmitted through just the second gear pairs, in the order 35, 55.

As will be recognised, in three of the four options (540E, 1000, 1000E), there is only a one-tooth engagement through transmission of the torque via just a single gear pair, which one-tooth engagement results in lower power losses than the three-teeth engagement for 540 rpm in conventional mode.

With just three gear pairs producing the four output speeds, a relatively compact unit may be provided. Additionally, by the use of clutch mechanisms K1 and K2, it is possible to switch under load between economy and conventional modes at 540 rpm and also at 1000 rpm.

From reading of the present disclosure, other variations and modifications will be apparent to the skilled reader. For example, whilst all three gear pairs will be engaged and rotating in the embodiment of FIG. 2, the optional clutch mechanism 11 may be provided to disengage the third gear pair 23, 68 when not required (for running at 1000 rpm output speed).

The invention claimed is:

1. A power take off drive train for a utility vehicle, comprising:
   first, second and third parallel gear pairs;
   an input shaft coupled to a gear of the first gear pair;
   first and second connector means, each operable to couple a gear of the first gear pair with a gear of the second gear pair;
   third connector means coupling a first gear of the second gear pair with a first gear of the third gear pair;
   an output shaft; and
   selector means operable to couple the output shaft with either a second gear of the second gear pair or a second gear of the third gear pair.

2. A power take off drive train as claimed in claim 1, wherein each of the first and second connector means is a clutch mechanism.

3. A power take off drive train as claimed in claim 1, wherein a first gear of each gear pair shares a common axis of rotation with the input shaft.

4. A power take off drive train as claimed in claim 1, wherein a second gear of each gear pair shares a common axis of rotation with the output shaft.

5. A power take off drive train as claimed in claim 1, wherein the selector means is a sliding sleeve mechanism connected with the output shaft and movable in the axial direction thereof into driving engagement with the second gear of either the second gear pair or third gear pair.

6. A power take off drive train as claimed in claim 1, wherein the third connector means is a common shaft on which the first gears of the second and third gear pairs are mounted.

7. A power take off drive train as claimed in claim 1, wherein the third connector means is a clutch mechanism selectively operable to connect and disconnect the first gears of the second and third gear pairs.

8. A utility vehicle having an engine and a power take off drive train as claimed in claim 1, with the input shaft driven by the engine.

* * * * *